United States Patent
Goustiaux et al.

(10) Patent No.: US 8,282,724 B2
(45) Date of Patent: Oct. 9, 2012

(54) INK COMPOSITION FOR INKJET PRINTING BY THE CONTINUOUS DEFLECTED JET TECHNIQUE

(75) Inventors: Cecile Goustiaux, Saint Marcellin (FR); Virginie Rio, Etables (FR); Jean-Yves Sabys, La Roche de Glun (FR); Antoine Bataille, Loriol sur Drome (FR)

(73) Assignee: Markem-Imaje, Bourg les Valence (FR)

( * ) Notice: Subject to any disclaimer, the term of this patent is extended or adjusted under 35 U.S.C. 154(b) by 308 days.

(21) Appl. No.: 12/526,501

(22) PCT Filed: Feb. 11, 2008

(86) PCT No.: PCT/EP2008/051609
§ 371 (c)(1),
(2), (4) Date: Aug. 7, 2009

(87) PCT Pub. No.: WO2008/098899
PCT Pub. Date: Aug. 21, 2008

(65) Prior Publication Data
US 2010/0028632 A1  Feb. 4, 2010

(30) Foreign Application Priority Data
Feb. 13, 2007  (FR) ..................... 07 53225

(51) Int. Cl.
*C09D 11/02*  (2006.01)
(52) U.S. Cl. .................. 106/31.58; 106/31.86
(58) Field of Classification Search ........ 106/31.58, 106/31.86
See application file for complete search history.

(56) References Cited

U.S. PATENT DOCUMENTS

| | | | |
|---|---|---|---|
| 4,024,096 A | 5/1977 | Wachtel | |
| 4,153,593 A | 5/1979 | Zabiak et al. | |
| 4,155,767 A | 5/1979 | Specht et al. | |
| 4,155,895 A | 5/1979 | Rohowetz et al. | |
| 4,166,044 A | 8/1979 | Germonprez et al. | |
| 4,260,531 A | 4/1981 | Wachtel et al. | |
| 4,465,800 A | 8/1984 | Bhatia | |
| 4,567,213 A | 1/1986 | Bhatia | |
| 4,756,758 A | 7/1988 | Lent et al. | |
| 4,880,465 A | 11/1989 | Loria et al. | |
| 5,102,458 A | 4/1992 | Lent et al. | |
| 5,395,431 A | 3/1995 | Siddiqui et al. | |
| 5,395,432 A | 3/1995 | Nelson | |
| 5,576,406 A | 11/1996 | Yamamura | |
| 5,637,139 A | 6/1997 | Morelos et al. | |
| 6,814,791 B2 | 11/2004 | Moore et al. | |
| 6,869,986 B1 | 3/2005 | Millot et al. | |
| 6,911,293 B2 | 6/2005 | Wanat et al. | |
| 7,833,334 B2 | 11/2010 | De Saint-Romain | |
| 2002/0100393 A1 | 8/2002 | Moore et al. | |
| 2007/0248838 A1 * | 10/2007 | De Saint-Romain | 428/608 |
| 2009/0270537 A1 * | 10/2009 | Hoogmartens et al. | 524/101 |

FOREIGN PATENT DOCUMENTS

| | | |
|---|---|---|
| EP | 0034881 | 9/1981 |
| EP | 0289141 | 11/1988 |
| EP | 0510752 | 10/1992 |
| EP | 0735120 | 10/1996 |
| EP | 1103584 | 5/2001 |
| FR | 2460982 | 1/1981 |
| FR | 2796959 | 2/2001 |
| GB | 2277094 | 10/1994 |
| GB | 2298713 | 9/1996 |
| WO | 96/23844 | 8/1996 |
| WO | 2006/097502 | 9/2006 |

OTHER PUBLICATIONS

International Search Report and Written Opinion in International Application No. PCT/EP2008/051609, mailed Jun. 11, 2008.
French Search Report in French Application No. FR 0753225, dated Aug. 21, 2007.

* cited by examiner

*Primary Examiner* — Melvin C Mayes
*Assistant Examiner* — Veronica F Faison
(74) *Attorney, Agent, or Firm* — Nixon Peabody LLP

(57) ABSTRACT

An ink composition for inkjet printing by the continuous deflected jet technique, which is liquid at ambient temperature, comprising: a) a binder; b) one or more dyes and/or pigments; and c) a solvent, in which: said solvent comprises at least 10% by weight—relative to the total weight of the ink composition—of at least one noncyclic acetal, and at least 5% by weight of one or more other organic compounds capable of dissociating the ionizable species that are found in the ink.

38 Claims, No Drawings

INK COMPOSITION FOR INKJET PRINTING BY THE CONTINUOUS DEFLECTED JET TECHNIQUE

CROSS REFERENCE TO RELATED APPLICATIONS OR PRIORITY CLAIM

This application is a national phase of International Application No. PCT/EP2008/051609, entitled "INK COMPOSITION FOR INKJET PRINTING BY THE CONTINUOUS DEFLECTED JET TECHNIQUE", which was filed on Feb. 11, 2008, and which claims priority of French Patent Application No. 07 53225, filed Feb. 13, 2007.

DESCRIPTION

The invention relates to an ink composition for marking supports, substrates and objects of all types, the properties of which are particularly suitable for liquid jet printing or marking, by the so-called "continuous deflected jet" technique, of a very large variety of supports, substrates and objects, whether they are porous or nonporous.

Inkjet printing is a well known technique, which allows the printing, marking or decoration of all types of objects, at high speed, and without these objects coming into contact with the printing device, with messages that can be varied on demand, such as barcodes, sell-by dates, etc. and this being even on nonplanar supports.

Inkjet printing systems can be divided into two main types: "drop on demand" (DOD) and the "continuous inkjet" (CIJ) type.

We are interested more particularly in the latter technique, more specifically in the continuous deflected jet technique.

Continuous deflected jet spraying consists in sending ink, under pressure, into a cavity containing a piezoelectric crystal, from where the ink escapes via an orifice (nozzle) in the form of a jet. The piezoelectric crystal, vibrating at a given frequency, causes pressure disturbances in the inkjet, which oscillates and gradually breaks up into spherical droplets. An electrode, placed in the path of the jet, where it breaks up, makes it possible to give these drops an electrostatic charge, if the ink is conductive. The drops thus charged are deflected in an electric field and enable the printing. The drops which are not charged, and are therefore not deflected, are recovered in a gutter where the ink is sucked up, then recycled to the ink circuit.

This type of inkjet spraying provides contactless marking at high throughput speed on objects that are not necessarily planar and with the possibility of changing the message on demand.

The technique is particularly suitable for the marking and identification (expiration dates, serial numbers, batch numbers, barcode numbers, etc.) of industrial products on production lines, or for post coding postal letters and packets.

"Drop on demand" jet spraying may be carried out by "bubble" jet spraying or by "piezoelectric" jet spraying. In the first case, the ink is vaporized in the vicinity of the nozzle and this vaporization causes the ejection of the small amount of ink located between the resistor which vaporizes the ink and the nozzle. In the second case, a sudden pressure variation caused by an actuator set in motion by the electrical excitation of a piezoelectric ceramic or crystal and located in the vicinity of the nozzle, causes the ejection of a drop of ink.

The ink compositions suitable for continuous deflected jet spraying must satisfy a certain number of criteria inherent to this technique, relating, among others, to the viscosity, electrical conductivity, solubility in a solvent for cleaning, compatibility of the ingredients, correct wetting of the supports to be marked, etc.

Furthermore, these inks must dry rapidly, and be capable of flowing or of remaining immobile in the vicinity of the nozzle without blocking it, with a high orientation stability of the jet while allowing easy cleaning of the printhead.

The ingredients which make up current inks, for the inkjet of continuous deflected jet type, are organic or mineral products; they are dyestuffs, such as dyes or pigments, resins or binders, in one or more solvents that are more or less volatile or in water, optionally one or more conductive salts, and also various additives.

The ingredients which make up current inks for the inkjet of drop on demand type are also organic or mineral products; dyes or pigments, resins or binders, in one or more solvents that are more or less volatile or in water, in proportions different from those of the inks for continuous deflected inkjet, but without the need for electrical conductivity.

The dyestuffs are called "dyes or pigments", depending on whether they are respectively soluble or insoluble in the solvent used.

The pigments, which are by nature insoluble, are therefore dispersed and may be opaque or nonopaque. They give the ink its color, its opacity, or particular optical properties, such as fluorescence (cf. patents or patent applications U.S. Pat. Nos. 4,153,593, 4,756,758, 4,880,465, EP-A-0 289 141, U.S. Pat. No. 5,395,432, GB-A-2 298 713). In certain cases, the dyes themselves also give the ink sufficient conductivity so that there is no need to add a conductive salt. The dyes known under the name C.I. Solvent Black 27, 29, 35 and 45 fall into this category.

The binder(s) or resin(s) is (are) for the most part solid and polymeric compound(s) and their choice is dictated by their solubility in the chosen solvents and by their compatibility with the dyes and the other additives, but also and especially depending on the properties that they give the film of ink, once dry.

Their primary role is to give the ink adhesion to the maximum number of supports or to specific supports, for example nonporous supports. They also make it possible to give the ink the appropriate viscosity for forming drops from the jet and they provide the ink, or rather the marking obtained, with most of its properties of resistance to physical and/or chemical attacks.

The additives comprise:
plasticizers which render the dry ink film flexible and which may improve the adhesion and cohesion of the ink on the marked support;
dispersants which enable the dispersion of the pigments. Such dispersants stabilize the pigments by a steric effect and/or by an electrostatic effect depending on whether they are ionizable or not, and depending on the polarity of the solvent;
agents which inhibit the corrosion induced by certain salts such as chlorides which provide conductivity (see documents EP-A-0 510 752, U.S. Pat. No. 5,102,458);
additives which protect the ink against the growth of bacteria and other microorganisms (biocides, bactericides, fungicides and the like), which are particularly useful in inks containing water;
pH-regulating buffers (see EP-A-0 735 120); and
antifoaming agents.

Inkjet inks may also comprise surfactants or tensioactive agents which modify the wettability or penetratability of the ink (cf. U.S. Pat. No. 5,395,431), in particular those which modify or control the static or dynamic surface tension such as FLUORAD FC 430 from 3M. Such products control the size of the impacts of the drops. Thanks to them, the impacts of the drops all have the same diameter regardless of the nature, cleanliness or evenness of the support.

The additives also comprise, in the case of inks for continuous deflected inkjet printing, optionally one or more conductive salts.

The optional conductive salt(s) give(s) the ink the conductivity necessary for electrostatic deflection. Reference may be made, on this subject, to document U.S. Pat. No. 4,465,800. However, it should be noted that in some cases too, the dyes already provide enough conductivity to the ink so that there is no need to add a conductive salt.

Among the salts which provide conductivity, any type of ionizable species, which can dissolve and dissociate in the solvent medium of the ink, is used.

For inks where the predominant solvent is water, providing conductivity to the ink does not generally pose a problem as most water-soluble products are ionizable species.

However, the aqueous medium does not allow a wide variety of formulations, as the solvating power of water is limited, and the evaporation rate of water is too slow to be able to take advantage of the high-speed printing opportunities that inkjets allow. Furthermore, the variety of organic solvents having a high dissolving power for the polymers and dyes makes it possible to formulate inks which dry rapidly and have excellent adhesion to all kinds of substrates.

On the other hand, in these organic media, conductivity is only possible when the solvents are sufficiently dissociating, that is to say when their dielectric permittivity and their dipole moment are sufficiently high. When this is the case, it is necessary to find a salt whose cation and anion are sufficiently soluble in the medium.

The solvent for these inks is most frequently composed of a mixture comprising, on the one hand, a generally predominant amount of volatile solvents of low viscosity, in order to enable very rapid drying of the markings and to adjust the viscosity to the desired value, for example from 2 to 10 mPa·s; and, on the other hand, more viscous and less volatile solvents that dry more slowly, in a lesser amount, to prevent the ink from drying in the nozzle during the phases when the printing device is shut down.

The volatile solvents used most often are alcohols, ketones or esters of low molecular weight, such as is indicated in U.S. Pat. Nos. 4,567,213, 5,637,139, and 6,814,791.

Among the solvents, mention may mainly be made of methanol, ethanol, 1-propanol and 2-propanol, acetone, methyl ethyl ketone (MEK), methyl isopropyl ketone, methyl propyl ketone, methyl isobutyl ketone, ethyl acetate, methyl acetate and dioxolane.

1,3-dioxolane is cited in U.S. Pat. No. 6,869,986 as a constituent of the solvent for an ink for inkjet printing. The dioxolane may represent from 10 to 85% by weight of the total weight of ink.

The less volatile solvents that, in particular, have a role of delaying drying are most commonly ketones, such as cyclohexanone, glycol ethers, cited in documents U.S. Pat. Nos. 4,024,096 and 4,567,213, ethers, furan and dioxane, mentioned in document U.S. Pat. No. 4,155,767, dimethylformamide or dimethyl sulfoxide (U.S. Pat. No. 4,155,895), lactones (EP-A-0,034,881), N-methylpyrrolidone (EP-A-0,735,120), glycols (WO-A-96,23,844), and even aliphatic hydrocarbons having, in addition, a role of penetrating oil films (U.S. Pat. No. 4,166,044), or else water, alone or in combination with other solvents, cited above, for which reference will be made to documents U.S. Pat. No. 4,153,593, GB-A-2,277,094 and FR-A-2,460,982.

Generally, the main or predominant solvents of the inks for continuous deflected jet spraying must meet a certain number of criteria, in particular:

their volatility must be sufficient so that the ink dries rapidly on the support to be marked, but not too high, in order not to evaporate too quickly in the printer, in particular during shut-down phases, and thus to enable a good quality of starting after long shutdowns;

their solvating power, with regard to ink binders, dyes or pigment dispersions and with regard to the supports to be printed, must make it possible to give the ink a good adhesion;

the predominant or main solvents (and also the minor solvents, to a lesser extent) must, in the case where the ink is an ink for continuous deflected jet printing, have the ability to keep the ionic species, such as the salts which give the ink its electrical conductivity, dissociated;

their effect on the health of individuals, namely their toxicity, harmfulness, irritant nature and inflammability, must be reduced;

they must make it possible to keep an ink, optionally intended to be ingested, sterile; and they must also be as non-hydrophilic as possible in order not to promote the absorption of water from the ambient humidity during recirculation of the ink in continuous deflected jet type printers. As water is almost always damaging to the formation and resistance of the ink films obtained with hydrophilic resins in organic solvents None of the so-called main or predominant solvents currently commonly used in inks for continuous jet printing simultaneously fulfill all the criteria mentioned above.

Thus, methanol is toxic and has a mediocre solvating power; ethanol is not sufficiently volatile, ethyl acetate and the other acetates have an extremely strong odor, which is an unacceptable defect in many applications; acetone is too volatile with a very low flashpoint (−18° C.); methyl ethyl ketone (MEK) has an adequate solubility and has good solvating power, but it is an irritant, has a distinctive odor and it is very inflammable with a flashpoint of −9° C., and furthermore, it is even proscribed by the regulations of certain countries; tetrahydrofuran (THF) has a higher volatility than that of methyl ethyl ketone, since its boiling point is 10° C. below that of methyl ethyl ketone, its flashpoint of −17° C. is almost as low as that of acetone, it can form explosive peroxides, it is an irritant like methyl ethyl ketone and inks containing more than 25% of it must be labeled as irritant.

There is therefore an unmet need for an ink composition suitable for continuous deflected jet printing, of which the solvent simultaneously fulfills, among others, all of the criteria mentioned above, as a consequence of which the desired properties are passed onto the ink, while the requirements, in particular regulatory requirements, in terms of toxicity and environmental protection, are satisfied.

It will also be advantageous to have an ink which has a drying time as close as possible to that of methyl ketone, without being subjected to the drawbacks thereof.

There is still a need for an ink suitable for inkjet printing by the continuous deflected jet technique which allows rapid marking of all types of objects with different surface characteristics, both porous and nonporous, while still giving a marking of excellent quality and evenness.

The ink must, moreover, give a marking which has a good adhesion and a good resistance to chemical attacks and, generally, have all the properties normally required for inks for inkjet printers, using the continuous jet technique: viscosity, resistivity, etc.

The ink must, furthermore, in order to allow high-speed marking, have a drying speed as high as possible.

In other words, the ink must simultaneously have the property of drying rapidly, of not clogging the nozzles and of thus enabling rapid starting, even after a shutdown of long duration.

The objective of the invention is therefore to provide an ink composition suitable for continuous deflected jet printing which fulfills, among others, all the needs indicated above, which satisfies the criteria and requirements mentioned above, and which does not have the drawbacks, limitations, defects and disadvantages of the ink compositions of the prior art, and which overcomes the problems of the compositions of the prior art linked, in particular, to the nature of the solvent that they contain.

This objective and others still are achieved, according to the invention, by an ink composition for inkjet printing by the continuous deflected jet technique, which is liquid at ambient temperature, comprising:
  a binder;
  one or more dyes and/or pigments; and
  a solvent;
  in which:
    said solvent comprises at least 10% by weight—relative to the total weight of the ink—of at least one noncyclic acetal, and at least 5% by weight of one or more other organic compounds capable of dissociating the ionizable species that are found (present) in the ink.

The expression "ambient temperature" is generally understood to a mean a temperature of 5 to 30° C., preferably from 10 to 25° C., more preferably from 15 to 24° C. and better still from 20 to 23° C. It is clearly understood that the ink is liquid at atmospheric pressure.

Said noncyclic acetal is generally chosen from ethylal, methylal, acetal, dimethylacetal and mixtures thereof. Among the aforementioned compounds, ethylal is preferred.

In order to remove any ambiguity on the exact nature of ethylal, it belongs to the family of acetals and has the following synonyms:
  ethoxymethyl ethyl ether;
  1,1-diethoxymethane;
  methane, diethoxy-;
  ethane, 1,1'-[methylenebis(oxy)]bis-;
  diethylformal;
  formaldehyde diethyl acetal.

Ethylal has the empirical formula $C_5H_{12}O_2$ and the CAS number [462-95-3].

Its structural formula is the following:

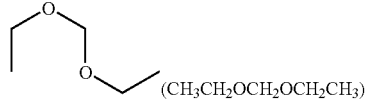
($CH_3CH_2OCH_2OCH_2CH_3$)

Methylal has the following synonyms:
  methoxymethyl methyl ether;
  1,1-dimethoxymethane;
  methane, dimethoxy-;
  dimethylformal;
  formaldehyde dimethyl acetal.

Methylal has the empirical formula $C_3H_8O_2$ and the CAS number [109-87-5].

Its structural formula is the following:
$CH_3OCH_2OCH_3$.

Acetal has the following synonyms:
  1,1-diethoxyethane;
  acetaldehyde diethyl acetal.

Acetal has the empirical formula $C_6H_{14}O_2$ and the CAS number [105-57-7].

Its structural formula is the following:

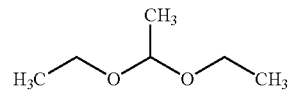

Dimethylacetal has the following synonyms:
  1,1-dimethoxyethane;
  acetaldehyde dimethylacetal.

Dimethylacetal has the empirical formula $C_4H_{10}O_2$ and the CAS number [534-15-6].

Its structural formula is the following:

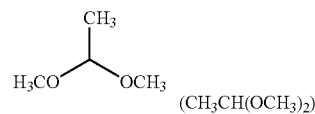
($CH_3CH(OCH_3)_2$)

These noncyclic acetal solvents are mainly used as a reaction medium in organic chemistry for reactions requiring an aprotic solvent. They are also used as an extraction solvent, or as an ethoxy methylating agent in organic synthesis. They are also used in the formulation of adhesives, in antiseptic preparations or else in paint strippers.

U.S. Pat. No. 6,911,293 discloses photosensitive compositions comprising a solvent based on acetals or on ketals that can be used in microlithography for manufacturing semiconductors. This patent does not make any reference to inks, even less to specific inks for inkjet printing.

U.S. Pat. No. 5,576,406 discloses compositions that can be polymerized by cationic polymerization in which the solvent is an acetal such as ethylal, and indicates that such compositions may be used for the formulation of liquid paints or of powdered paints. The use of these compositions in inks and in particular inks for inkjet printing is not mentioned.

U.S. Pat. No. 4,155,767 describes ink compositions for inkjet printing. In particular, the type B composition from this document is an inkjet ink without binder which comprises from 15 to 20% of THF; from 10 to 35% of water; from 6 to 25% of an aliphatic alcohol; from 25 to 75% (or 20 to 65%) of a cyclic or aliphatic ketone, of an aldehyde, of an acetal whose exact nature is not specified, of an ether or of an ester; from 1 to 17% of an electrolyte; from 6 to 17% of a surfactant and from 0.5 to 5% of a dye.

The type B ink composition mentioned in column 6 does not contain acetal.

It is the same for the B formulation from example 1 of this document.

The invention is based on the surprising observation that a noncyclic acetal, and especially ethylal, allows the formulation of an ink that is particularly suitable for continuous jet spraying and of which the evaporation rate is greater than that of similar compositions based on ethanol alone, while this evaporation rate is closer to that of methyl ethyl ketone, whereas the boiling point of ethylal is 8° C. higher than that of ethanol. It has also been very surprising to observe that the evaporation rate of inks based on methyl propyl ketone was increased by replacing some of (a part of) this ketone with a noncyclic acetal, preferably chosen from the 4 acetals listed above, and especially with ethylal.

Moreover, the noncyclic acetals used according to the invention, in particular the four noncyclic acetals mentioned above, and especially ethylal, have the advantage of being more volatile than cyclic acetals and therefore have an increased evaporation rate.

Indeed, the problems which are faced in ink compositions, for continuous deflected inkjet printing, are extremely specific, so that even similar solutions, which could have been able to be adopted in ink compositions used for other techniques, cannot be transposed, immediately and directly, to ink compositions for continuous jet printing.

A fortiori, the optional use of a noncyclic acetal, such as the 4 acetals cited and in particular ethylal, in even further remote compositions, such as paint compositions—inevitably opaque unlike ink compositions—or such as adhesive compositions or antiseptic solutions, would absolutely not make it possible to conclude that a noncyclic acetal, such as ethylal, may be suitable for a very specific use in an ink and, even more specifically, in an ink for continuous deflected jet printing.

It does not obviously follow from known compositions that the choice of a noncyclic acetal, and even more specifically of ethylal, from among the multiplicity of existing organic solvents may result in an ink that meets all the criteria, requirements and needs mentioned above, especially in relation to the nature of the solvent. The use of a noncyclic acetal such as ethylal, in such ink compositions, is neither described nor suggested in the prior art.

The criteria and requirements defined as regards the properties of a solvent for an ink composition for continuous jet spraying are fulfilled by noncyclic acetals and especially by ethylal. Thus, as regards ethylal:
  its boiling point is 88° C., which is close to the boiling points of ethanol and methyl ethyl ketone, although higher; and
  its vapor pressure at 25° C. is 80 mbar which is very close to that of ethanol which is 76 mbar.

The vapor pressure and boiling point values are good indicators of a rapid evaporation rate.

Its ability to dissolve a large number of polymers is also very advantageous for obtaining a good adhesion to a large number of supports to be marked.
  It completely dissolves polyhydroxystyrene, phenolic resins, acrylic acid resins, rosin and some of its derivatives, ketone and aldehyde resins and, more generally speaking, the same resins as those that are soluble in ethanol.
  Its ability to dissolve dyes, in particular C.I. solvent dyes, is as good as that of ethanol.
  Ethylal is an inflammable product with a flashpoint equal to −5° C., but which is not harmful, nor irritant. Its odor is neither strong, nor disagreeable.
  Ethylal is more advantageous than:
  methanol which is toxic and has a much lower solvating power;
  ethyl acetate, or other acetates, of which the odor is very strong;
  acetone which is too volatile with a very low flashpoint (−18° C.); and
  methyl ethyl ketone, which is an irritant, has a lower flashpoint (−9° C.) and which is too hydrophilic.

Due to noncyclic acetals, such as the 4 acetals mentioned above, and especially to ethylal and according to the invention, it is possible, surprisingly, to formulate inks that are truly free of methyl ethyl ketone, and which are therefore free from the inherent drawbacks of the latter, but which have, however, almost all the advantages of methyl ethyl ketone.

In particular, the inks according to the invention have a high stability, due to the noncyclic acetal, and in particular to ethylal.

Another most particular advantage of ethylal is that it forms, with water and ethanol, a water-rich azeotrope. Thus, during the evaporation of the ink in the printer circuits, the evaporation of the water-rich azeotrope will favorably contribute to the removal of the moisture from the atmosphere absorbed by the ink during its crosslinking in the printer. The low affinity of ethylal for water will strengthen the ability of the ink to not absorb moisture from the ambient air.

The ink composition according to the invention, and more specifically the solvent included in it, moreover contains at least 5% by weight relative to the total weight of the ink, of another organic compound—that is to say an organic compound different from the noncyclic acetal, such as ethylal—capable of dissociating the ionizable species, in particular the salts and especially the conductive salts, which are needed most of the time in the inks for continuous deflected inkjet printing.

Specifically, the dissociating ability, power, of the noncyclic acetal such as ethylal is not sufficient for it to be used as the sole solvent. This is the reason why it must be combined, according to the invention, with a second solvent to obtain the necessary conductivity, in particular for its use in continuous jet printing.

Such a combination, without in any way adversely affecting the advantageous properties of the noncyclic acetal such as ethylal mentioned above, provides the dissociating ability necessary for the preferred use which is made of the ink in continuous deflected inkjet printing and, in particular, makes it possible to dissociate the conductive salts which are necessary most of the time in the inks for continuous deflected inkjet printing.

In other words, it can be said that the noncyclic acetal, such as ethylal, combined with a dissociating solvent for the ions, simultaneously provides the adhesion to plastic or rubbery materials, the "sprayability" by continuous deflected jet, and the evaporation rate, while retaining a good formation of the ink film.

Preferably, the composition according to the invention comprises from 10 to 85% by weight, more preferably from 35 to 50% by weight, of at least one noncyclic acetal such as ethylal, methylal, acetal, dimethylacetal, or a mixture of two or more of these, relative to the total weight of the composition.

Preferably, the composition according to the invention comprises from 5 to 70% by weight of said other organic compound(s), more preferably from 10 to 40% by weight relative to the total weight of the composition of said other organic compound(s).

The solvent taken in its entirety generally represents from 30 to 95%, preferably from 50 to 90% by weight of the total weight of the composition.

Said other organic compound(s) forming part of the solvent and being other than the noncyclic acetal, such as ethylal, is (are) chosen, for example, from alcohols, in particular low molecular weight alcohols, for example aliphatic alcohols; ketones, preferably of low molecular weight; alkylene glycol ethers; alkylene glycol esters and alkylene glycol ether esters such as acetates; dimethylformamide; N-methylpyrrolidone; esters; linear or cyclic ethers; aliphatic, cyclic or noncyclic, for example linear or branched, hydrocarbons; aromatic or nonaromatic hydrocarbons; carbonates such as propylene carbonate, ethylene carbonate and dimethyl and diethyl carbonate; and all the compounds known by a person skilled in the art for their ability to dissociate the species that can be ionized or dissociated into ions (ionizable species), such as salts; and mixtures thereof. The compounds that have such an ability to dissociate these species are generally understood to be liquid compounds that produce solutions that conduct electricity, when said species are found therein.

Preferably, said other organic compound(s) forming part of the solvent is (are) organic solvents whose volatility is below that of the noncyclic acetal such as ethylal.

Preferably, this or these compound(s) has (have), in addition, the property of dissolving the other ingredients of the ink, especially the binder, the dyestuffs, the additives, etc., and/or the property of slowing down the evaporation of the ink, relative to an ink which only contains the noncyclic acetal, for example ethylal, as solvent.

The alcohols will preferably be chosen from linear or branched aliphatic alcohols having 1 to 5 carbon atoms such as methanol, denatured or nondenatured ethanol, depending on the regulation in force in the country of use, 1-propanol, 2-propanol, n-butanol, 2-butanol, tert-butanol, etc.

The ketones will preferably be chosen from ketones having 3 to 10 carbon atoms, such as acetone, butanone (methyl ethyl ketone), 2-pentanone (methyl propyl ketone), 3-methyl-2-butanone (methyl isopropyl ketone) and 4-methyl-2-pentanone (methyl isobutyl ketone).

The alkylene glycol ethers are generally chosen from monoalkyl ($C_1$ to $C_6$ alkyl group) or dialkyl ($C_1$ to $C_6$ alkyl group) ethers of alkylene glycols comprising 1 to 10 carbon atoms in the alkylene chain; preferably these are ethylene or propylene glycol ethers such as methoxypropanol.

The glycol esters and the glycol ether esters are preferably chosen from esters of glycol and of glycol ethers with saturated aliphatic carboxylic acids having 1 to 6 carbon atoms, such as formic acid, acetic acid, propionic acid, butyric acid, valeric acid and caproic acid.

Mention may be made, by way of example, of methoxypropyl acetate, butyl diglycol acetate, etc.

The esters are preferably chosen from low molecular weight esters such as formates, acetates, propionates or butyrates of alcohols having from 1 to 10 carbons.

The ethers are preferably chosen from low molecular weight ethers such as dioxolane or tetrahydrofuran.

It has been observed that a solvent comprising, preferably composed of, ethylal and acetone solvents, i.e. the combination of ethylal and acetone solvents, preferably in the proportions of 10 to 90% e.g. 50% by weight of ethylal, and 90% to 10% e.g. 50% by weight of acetone relative to the weight of solvent; or ethylal and methyl propyl ketone, preferably in the same proportions (90/10 e.g. 50-10/90 e.g. 50); or else a solvent comprising, preferably composed of ethylal and methyl isopropyl ketone, preferably in the same proportions (90/10 e.g. 50-10/90 e.g. 50), surprisingly gives inks that dry particularly rapidly.

The ink composition according to the invention also comprises a binder comprising one or more polymers and/or resins.

These polymers and/or resins are preferably chosen from (meth)acrylic, vinyl, ketone, phenolic, cellulose, styrene and epoxy resins; polyurethanes, styrene-acrylates, and combinations of two or more of the latter.

Examples of these resins are the following:

For the acrylic resins, methacrylic resins and styrene acrylates, JONCRYL® from Johnson Polymer, ACRYLOID® and PARALOID® from Rohm & Haas, SMA® from Atochem or NEOCRYL® from Zeneca.

For the vinyl resins, HOSTAFLEX® from Vianova, VINYLITE® from Union Carbide or VINNOL® from Wacker.

For the ketone resins, the products provided by Huls and BASF, such as the so-called AP and SK resins from Huls and the LAROPAL® resins from BASF.

For the phenolic resins, the products provided by Vianova under the trade name ALNOVOL®.

Among the cellulose resins, such as nitrocelluloses, ethyl celluloses, cellulose acetopropionates or acetobutyrates, mention may be made, for example, of the products provided by Hercules (AQUALON) or Eastman.

Among the epoxy resins, mention may be made of EPIKOTE® provided by Shell or ARALDITE from CIBA (or Huntsman).

Among the polyurethanes, mention may be made of SURKOPAK® from Mitchanol.

The proportion of binder in the ink composition according to the invention is generally from 0.1 to 40% by weight, preferably from 0.5 to 30%, more preferably from 1 to 25% and better still from 3 to 20% by weight relative to the total weight of the ink composition.

The ink composition may, in addition, comprise one or more plasticizers (for the resin(s) or polymer(s) of the binder) chosen, for example, from the plasticizers known to a person skilled in the art and chosen as a function of the binder used comprising one or more polymers and/or resins, mention may be made, as a plasticizer, of, for example, thermoplastic polyurethanes.

The solvating power of the acetal, such as ethylal, makes it possible to easily incorporate such plasticizing compounds into the composition of the invention.

The plasticizer(s) is (are) generally present in an amount of at least 0.05% by weight, preferably from 0.1 to 20% by weight, of the total weight of the ink composition.

The composition according to the invention also comprises one or more dyes and/or pigments.

The dye(s) and/or pigment(s) may be chosen from any dye or pigment suitable for the desired use, known to a person skilled in the art; some of these pigments or dyes have already been mentioned above.

These pigments also include lakes.

They will generally be chosen from the dyes and pigments known under the name of "C.I. Solvent Dyes" and "C.I. Pigments". By way of example of the most common pigments and dyes, mention may be made of C.I. Solvent Black 27, 29, C.I. Solvent Black 7, C.I. Solvent Black 35, 45, C.I. Solvent Blue 70, C.I. Solvent Red 124, dispersions of Pigment Blue 60 or of Pigment Blue 15.

The amount of dye(s) and/or pigment(s) is generally from 0.1 to 20% by weight, preferably from 3 to 10% by weight of the total weight of the ink composition.

Due to the ability of the acetal, especially ethylal, to dissolve the dye(s) in large amounts, it is especially possible, in the case of a fluorescent dye, to obtain particularly fluorescent inks, that is to say ones that are visible under weak UV illumination.

The ink composition according to the invention, that can be sprayed by a continuous deflected jet, may, in addition, generally comprise at least one conductive salt, except when another ingredient is itself a salt which can provide the conductivity when it is dissociated and gives sufficient conductivity to the ink so that there is no need to add an actual conductive salt.

This is because when the ink has to be applied by a continuous jet, it must have a sufficient electrical conductivity in the liquid state, generally greater than or equal to 300 µS/cm at 20° C., preferably greater than 500 μS/cm, more preferably around 500 to 2000 μS/cm, or more (at 20° C.).

The products that provide the ink with the conductivity necessary for continuous jet spraying are ionizable compounds, such as salts. It is possible that the dyes (as the pigments and solvents have no chance of providing conductivity to these inks) already present in the ink give enough conductivity to the latter so that there is no need to add an actual conductive salt. These dyes are inevitably salts: this is the case for the aforementioned compounds known under the name "C.I. Solvent Black 27, 29, 35 and 45".

However, it will often be necessary to include, in the ink composition, a conductive salt that strictly speaking is different from the dyes, and which is generally chosen from the salts of alkali metals such as lithium, sodium and potassium; the salts of alkaline-earth metals such as magnesium and calcium; and simple or quaternary ammonium salts; these salts being in the form of halides (chlorides, bromides, iodides, fluorides), perchlorates, nitrates, thiocyanates, formates, acetates, sulfates, sulfonates, propionates, trifluoroacetates, triflates (trifluoromethanesulfonates), hexafluorophosphates, hexafluoroantimonates, tetrafluoroborates, picrates and carboxylates, etc.

These conductive salts will therefore be present, if necessary, in the ink composition so as to impart the above conductivity to the ink; preferably, their amount is from 0.1 to 20% by weight, more preferably from 0.1 to 10% by weight, and better still from 0.1 to 5% by weight of the total weight of the ink composition.

The composition according to the invention may, in addition, comprise one or more additives chosen from compounds which improve the solubility of some of these components, the print quality, the adhesion, or else the control of the wetting of the ink on various supports.

The additive(s) could be chosen, for example, from antifoaming agents, chemical stabilizers, UV stabilizers; surfactants, such as FLUORAD® FC 430, stabilizing agents that inhibit salt corrosion; bactericides, fungicides and biocides, and pH-regulating buffers, etc.

The additive(s) is (are) used in very low doses, generally less than or equal to 5% and sometimes as low as 0.01%, depending on whether they are antifoaming agents, stabilizers or surfactants.

Another subject of the invention is a process for marking substrates, supports or objects, for example that are porous or nonporous, by spraying an ink composition, such as has been described above, onto these objects, substrates or supports.

The marking is carried out by inkjet printing via the continuous deflected jet technique.

Another subject of the invention is a substrate or support, for example that is porous or nonporous, provided with a marking obtained by the drying and/or absorption of the ink composition, such as described above.

This substrate may be made of metal, for example aluminum or steel (drink cans); made of glass (glass bottles); made of ceramic; made of a material containing cellulose such as paper, optionally coated or glossy, glazed paper, board or wood; made of a synthetic polymer ("plastic") especially in the form of films, such as PVCs, PETs, polyolefins, such as polyethylenes (PEs), or polypropylenes (PPs); made of "Plexiglas"; made of fabric, or made of any other nonporous or porous substance; or made from a composite of several of the preceding materials.

Preferably, the substrate is made of paper such as ordinary white paper, Kraft paper or "bond" paper.

This substrate may in particular be chosen from postal objects such as letters, envelopes, parcels, packets and stamps; identity documents such as identity cards and passports, banknotes, checks, share certificates, bond certificates, transport documents, entry tickets, plastic packaging films, for example for magazines and other newspapers delivered by post, etc.

Marking or printing of excellent quality is obtained on all the substrates, even ones that are not very porous and even on substrates having a very uneven surface.

The invention will be better understood on reading the following description of embodiments of the invention, given by way of illustrative and nonlimiting examples.

EXAMPLES

The following ink compositions according to the invention were prepared by mixing the products mentioned in Table I in the proportions indicated. This table also gives the viscosity and the conductivity of the inks obtained.

TABLE I

| CONSTITUENTS (weight percentages) | EXAMPLES | | | | | | |
|---|---|---|---|---|---|---|---|
| | No. 1 | No. 2 | No. 3 | No. 4 | No. 5 | No. 6 | No. 7 |
| Pure ethylal (>99%) | 41 | 25 | 16 | 17 | 17 | 17 | 17 |
| Methyl isopropyl ketone | | 60 | 67 | 67.8 | 67.4 | 67.4 | |
| Denatured ethanol | 42 | | | | | | |
| Methyl propyl ketone | | | | | | | 67.4 |
| Acrylic resin (1) | | 10 | | | | | |
| Phenolic resin (2) | 10 | | | | | | |
| Vinyl resin (3) | | | 9 | 9 | 9 | 9 | 9 |
| Solvent black 27 (4) | | 4 | | 6 | | 6 | 6 |
| Solvent black 3 (5) | | | | | 6 | | |
| Solvent black 29 (6) | 5 | | | | | | |
| Solvent yellow (7) | | | 0.85 | | | | |
| Solvent red (8) | | | 0.65 | | | | |
| Solvent blue 27 (9) | | | 4.5 | | | | |
| Surfactant (10) | | | | 0.2 | | 0.1 | 0.1 |
| Potassium hexafluorophosphate | 2 | 1 | 2 | | | 0.5 | 0.5 |
| Tetrabutyl ammonium hexafluorophosphate | | | | | 1 | 3 | |

TABLE I-continued

| CONSTITUENTS | EXAMPLES | | | | | | |
|---|---|---|---|---|---|---|---|
| (weight percentages) | No. 1 | No. 2 | No. 3 | No. 4 | No. 5 | No. 6 | No. 7 |
| Viscosity (mPa · s) | 2.5 | 3.1 | 4.2 | 4.24 | 4.5 | 5.1 | 4.9 |
| Conductivity (µS/cm) | 620 | 500 | 435 | 674 | 721 | 836 | 820 |

(1) PARALOID B66 from Rohm & Haas
(2) Novolac type phenolic resin from Vianova ® (ALNOVOL ® PN 320)
(3) VINNOL H14/36 from Wacker
(4) TELAJET NOIR NS from Clariant
(5) OIL BLACK 860 from Orient Chemical
(6) ORASOL NOIR RLI from Ciba
(7) MACROLEX YELLOW 6G from Bayer
(8) MACROLEX RED H from Bayer
(9) MACROLEX BLUE 3R from Bayer
(10) TEGOGLIDE 410 from Tego Chemie All the percentages are weight percentages.

According to the invention, each of the ink compositions from Table I give films that are very torque (tight) and glossy, and that adhere very well to a large variety of supports.

The inks thus prepared were tested in continuous deflected jet printers, manufactured by Imaje® of Jaime 1000 Series 4 type, and all of them produced printing of excellent quality.

EXAMPLE 1

The ink produced was a black ink, mainly used for its excellent adhesion to all sorts of supports used for packaging.

The solvating power of ethylal enabled Solvent black 29 to be dissolved.

EXAMPLE 2

This ink was a black ink, owing to the ability of ethylal to dissolve the dye of Solvent black 27 type.

EXAMPLES 3 to 7

These black inks adhered particularly well to PVC type supports.

Their excellent stability was obtained due to the presence of ethylal.

EXAMPLES 2 to 6

These multiple-use black inks had a particularly rapid drying, due to the combination of methyl isopropyl ketone and ethylal solvents.

Apart from the inks from Example 7, all the inks prepared were only labeled with F="highly flammable" according to European legislation.

These inks were not classified as either "XI" (irritant) nor as "XN" (harmful).

The invention claimed is:

1. An ink composition for inkjet printing by the continuous deflected jet technique, which is liquid at ambient temperature, comprising:
   a binder;
   one or more dyes and/or pigments; and
   a solvent, in which:
   said solvent comprises at least 10% by weight—relative to the total weight of the ink composition—of at least one noncyclic acetal, and from 10 to 70% by weight of one or more other organic compounds capable of dissociating the ionizable species that are found in the ink, and said solvent is substantially water-free.

2. The composition as claimed in claim 1, in which the noncyclic acetal is selected from the group consisting of ethylal, methylal, acetal, dimethylacetaL and mixtures thereof.

3. The ink composition as claimed in claim 1, comprising from 10 to 85% by weight relative to the total weight of the composition, of at least one noncyclic acetal.

4. The ink composition of claim 3, wherein said at least one noncyclic acetal is from 35 to 50% by weight relative to the total weight of the composition.

5. The composition as claimed in claim 1, comprising from 10 to 40% by weight relative to the total weight of the ink composition, of said other organic compound(s).

6. The ink composition as claimed in claim 1, in which said other organic compound(s) is (are) selected from the group consisting of alcohols; ketones; alkylene glycol ethers; alkylene glycol esters and alkylene glycol ether esters; dimethylformamide; N-methylpyrrolidone; esters; linear or cyclic ethers; aliphatic, cyclic or noncyclic hydrocarbons; aromatic or nonaromatic hydrocarbons; carbonates; and all the compounds known for their ability to dissociate the ionizable species and, optionally, their properties to dissolve the other ingredients of the ink composition and/or to slow down the evaporation of the ink; and mixtures thereof.

7. The composition as claimed in claim 6, in which said other compound(s) is (are) selected from the group consisting of linear or branched aliphatic alcohols having 1 to 5 carbon atoms; ketones having 3 to 10 carbon atoms; monoalkyl ($C_1$ to $C_6$ alkyl group) or dialkyl ($C_1$ to $C_6$ alkyl group) ethers of alkylene glycols comprising 1 to 10 carbon atoms in the alkylene chain; and esters of glycol and esters of glycol ethers with saturated aliphatic carboxylic acids having 1 to 6 carbon atoms.

8. The ink composition of claim 7, wherein at least one of said other organic compounds is selected from the group consisting of methanol, denatured or nondenatured ethanol, 1-propanol, 2-propanol, n-butanol, 2-butanol, and tert-butanol.

9. The ink composition of claim 7, wherein at least one of said other organic compounds is selected from the group consisting of ethylene glycol and propylene glycol.

10. The ink composition of claim 6, wherein at least one of said other organic compounds is selected from the group consisting of alcohols and ketones, and has low molecular weight.

11. The ink composition of claim 6, wherein at least one of said other organic compounds is an acetate.

12. The ink composition of claim 6, wherein at least one of said other organic compounds is a linear or branched hydrocarbon.

13. The ink composition of claim 6, wherein at least one of said other organic compounds is selected from the group consisting of propylene carbonate, ethylene carbonate and dimethyl and diethyl carbonate.

14. The composition as claimed in claim 1, in which the solvent comprises a combination of ethylal and acetone, or a combination of ethylal and methyl propyl ketone, or a combination of ethylal and methyl isopropyl ketone.

15. The composition of claim 14, in which the solvent is composed of a combination of ethylal and acetone, or a combination of ethylal and methyl propyl ketone, or a combination of ethylal and methyl isopropyl ketone.

16. The ink composition as claimed in claim 1, in which said binder comprises one or more resins and/or polymers.

17. The ink composition as claimed in claim 16, in which said resin(s) and/or polymer(s) is (are) selected from the group consisting of (meth)acrylic, vinyl, ketone, phenolic, cellulose, styrene and epoxy resins, polyurethanes, styrene acrylates, and combinations of two or more of the latter.

18. The ink composition as claimed in claim 1, comprising from 0.1 to 40% by weight of binder relative to the total weight of the ink composition.

19. The ink composition of claim 18, wherein the binder is from 0.5 to 30% by weight relative to the total weight of the ink composition.

20. The ink composition of claim 19, wherein the binder is from 1 to 25% by weight relative to the total weight of the ink composition.

21. The ink composition as claimed in claim 1, comprising, in addition, one or more plasticizers in an amount of at least 0.05% by weight of the total weight of the ink composition.

22. The ink composition of claim 21, wherein said one or more platicicizers is in an amount of 0.1 to 20% by weight of the total weight of the ink composition.

23. The ink composition as claimed in claim 1, in which said dye(s) and/or pigment(s) is (are) selected from the group consisting of the dyes and pigments known under the name of "C.I. Solvent Dyes" and "C.I. Pigments".

24. The composition as claimed in claim 1, comprising from 0.1 to 20% by weight of dye(s) and/or pigment(s) relative to the total weight of the ink composition.

25. The composition of claim 24, wherein the dye(s) and/or pigment(s) are from 3 to 10% by weight relative to the total weight of the ink composition.

26. The composition as claimed in claim 1, which has a conductivity in the liquid state greater than 300 μS/cm at 20° C.

27. The composition of claim 26, wherein the conductivity in the liquid state is greater than or equal to 500 μS/cm at 20° C.

28. The composition of claim 27, wherein the conductivity in the liquid state is from 500 to 2000 μS/cm at 20° C.

29. The composition as claimed in claim 1, comprising, in addition, at least one conductive salt in an amount of 0.1 to 20% by weight of the total weight of the ink composition.

30. The ink composition as claimed in claim 29, in which said conductive salt is selected from the group consisting of the salts of alkali and alkaline-earth metals, and the simple or quaternary ammoniums salts, in the form of halides, perchlorates, nitrates, thiocyanates, formates, acetates, sulfonates, propionates, trifluoroacetates, triflates (trifluoromethanesulfonates), hexafluorophosphates, hexafluoroantimonates, tetrafluoroborates, picrates, carboxylates and sulfates.

31. The composition of claim 29, wherein the conductive salt is in an amount of 0.1 to 10% by weight of the total weight of the ink composition.

32. The ink composition as claimed in claim 1, comprising, in addition, one or more additives selected from the group consisting of antifoaming agents, chemical stabilizers, UV stabilizers, surfactants, agents that inhibit salt corrosion; bactericides, fungicides and biocides, and pH-regulating buffers.

33. A process for marking objects, substrates and supports by inkjet printing via the continuous deflected jet technique, by spraying an ink composition onto these objects, substrates or supports, characterized in that the ink composition sprayed is an ink composition as claimed in claim 1.

34. A substrate having a marking obtained by drying and/or absorption of an ink composition comprising:
a binder;
one or more dyes and/or pigments; and
a solvent, in which:
said solvent comprises at least 10% by weight—relative to the total weight of the ink composition—of at least one noncyclic acetal, and from 10 to 70% by weight of one or more other organic compounds capable of dissociating the ionizable species that are found in the ink, and said solvent is substantially water-free.

35. The substrate as claimed in claim 34, characterized in that the substrate is made of metal comprised of aluminum or steel; made of glass; made of ceramic; made of a material containing cellulose; made of a synthetic polymer ("plastic"); made of polymethylmethacrylate; made of fabric, or made of any other nonporous or porous substance; or made from a composite of several of the preceding materials.

36. The substrate as claimed in claim 35, wherein the substrate is made of coated, uncoated, or glossy paper, board, or wood.

37. The substrate as claimed in claim 35, wherein said synthetic polymer is in the form of a film or films.

38. The substrate of claim 35, wherein said synthetic polymer is selected from the group consisting of PVCs, PETs, and polyolefins, such as polyethylenes (PEs), and polypropylenes (PPs).

* * * * *